US007212990B1

(12) United States Patent
Greden et al.

(10) Patent No.: US 7,212,990 B1
(45) Date of Patent: May 1, 2007

(54) SYSTEM AND METHOD FOR MANAGING AND CONTROLLING ACCOUNTS WITH PROFILE INFORMATION

(75) Inventors: Daniel J. Greden, Bellevue, WA (US); Alexander Castro, Redmond, WA (US); Alex A. Simons, Kirkland, WA (US); Scott A. Smith, Bellevue, WA (US); Susan P. Scheer, Seattle, WA (US); Se-Wai Lee, Bellevue, WA (US)

(73) Assignee: Microsoft Corp., Redmond, WA (US)

( * ) Notice: Subject to any disclaimer, the term of this patent is extended or adjusted under 35 U.S.C. 154(b) by 803 days.

(21) Appl. No.: 09/584,232

(22) Filed: May 31, 2000

(51) Int. Cl.
*G06Q 30/00* (2006.01)
(52) U.S. Cl. .................... 705/26; 705/1; 705/14
(58) Field of Classification Search .............. 705/1, 705/14, 26, 27, 2; 707/6, 10; 709/202, 232, 709/224
See application file for complete search history.

(56) References Cited

U.S. PATENT DOCUMENTS

| | | | | |
|---|---|---|---|---|
| 5,664,115 | A * | 9/1997 | Fraser | 705/37 |
| 5,696,965 | A * | 12/1997 | Dedrick | 707/10 |
| 5,796,952 | A * | 8/1998 | Davis et al. | 709/224 |
| 6,014,638 | A * | 1/2000 | Burge et al. | 705/27 |
| 6,108,686 | A * | 8/2000 | Williams, Jr. | 709/202 |
| 6,236,977 | B1 * | 5/2001 | Verba et al. | 705/10 |
| 6,321,202 | B1 * | 11/2001 | Raveis, Jr. | 705/1 |
| 6,327,574 | B1 * | 12/2001 | Kramer et al. | 705/14 |
| 6,412,012 | B1 * | 6/2002 | Bieganski et al. | 709/232 |
| 6,470,338 | B1 * | 10/2002 | Rizzo et al. | 707/6 |
| 6,484,149 | B1 * | 11/2002 | Jammes et al. | 705/26 |
| 6,505,202 | B1 * | 1/2003 | Mosqurea et al. | 707/10 |
| 6,578,011 | B1 * | 6/2003 | Forward | 705/14 |
| 6,684,196 | B1 * | 1/2004 | Mini et al. | 705/26 |
| 2005/0131727 | A1 * | 6/2005 | Sezan et al. | 705/1 |

FOREIGN PATENT DOCUMENTS

WO    WO 97/22074 A1 *  6/1997

OTHER PUBLICATIONS

Homegain.com Launches Service to Match Homebuyers with Real Estate Agents, Sep. 13, 1999, PR Newswire, pp. 1-2.*

* cited by examiner

*Primary Examiner*—Jeffrey A. Smith
*Assistant Examiner*—Jason B. Dunham
(74) *Attorney, Agent, or Firm*—Lyon & Harr, LLP; Katrina A. Lyon (57) ABSTRACT

The present invention is embodied in a system and method for managing and controlling accounts with generated profile information. The system includes a data generator, a database and a search agent. The data generator generates, collects and processes data about potential buyers and generates customer profiles. Data can be collected and processed by any suitable means for generating profiles, such as a data gathering session. In one example, a potential buyer can be provided with an interactive browsing environment and allowed to select information related to products or services. The search agent is used to create the database, which comprises buyers having organized profiles that define specific criteria. A profile of the buyer can be created by inferring criteria desired by the buyer based on the interactive browsing and the selections made by the buyer. The profile and the inferred criteria can be compared with criteria of the products or services to match specific products or services of subscribing sellers that the buyer has a potential interest in based on the created profile of the buyer.

14 Claims, 6 Drawing Sheets

SYSTEM AND METHOD FOR MANAGING AND CONTROLLING ACCOUNTS WITH PROFILE INFORMATION

BACKGROUND OF THE INVENTION

1. Field of the Invention

The present invention relates to a system and method for processing data, and in particular, to a system and method for managing and controlling accounts of potential customers with generated profile information. The profile information can contain pre-developed inferences about the potential customers.

2. Related Art

In a typical passive sales scheme, a customer initiates contact with a seller that is known to have specific products or services desired by the customer. In this type of sales scheme, the seller does not have direct control of customer contact. As such, in passive marketing, the sale of a product or service is dependent on customer initiated contact with a seller that a customer knows has a specific product or service desired by the customer. Typically, for passive marketing, sellers usually use public dissemination, including radio, television, Internet and public directories to make their products/services known to customers. However, mass public dissemination is expensive and does not always reach all potential customers of the seller.

In one example, some sellers provide searchable computer listings with the hope that an interested customer will find the listing. For instance, if a customer desires to purchase a home, typically, the customer can search a seller created database of home listings. The customer can usually search the home listings based on certain criteria defined by the customer. However, this type of passive marketing limits the sales power of a seller because customers have to initiate contact with the seller and the seller does not know what customers specifically desire before contact is made by the customers.

Thus, sellers of products or services typically prefer active marketing or targeted marketing sales schemes. Active marketing or target marketing involves the seller actively seeking or targeting only those customers that the seller believes would be potentially interested in the product or service offered by the seller. For example, in a typical targeted marketing sales scheme, a seller attempts to find and advertise to specific customers (targeted customers) that are thought to be interested in the seller's products or services. These customers are usually thought to be interested in certain products or services because they at one time or another showed some type of an interest in these certain products or services, indicated through, for example, mailing lists for these certain products or services. Hence, target marketing is preferred by sellers because the seller is in control, which creates a higher likelihood that a sale will be generated.

However, many current targeting marketing schemes are expensive, time consuming and difficult. This is because many current target marketing schemes require either purchasing expensive established mailing lists or manually evaluating surveys or questionnaires. Therefore, what is needed is a system and method that electronically attracts customers and targets potential customers by generating, managing and controlling profile information of potential customers that match predefined criteria. What is also needed is an automated software system and method that attracts customers and generates customer profile information from inferred data for allowing a seller to actively seek potential customers that would be interested in the seller's specific products or services.

SUMMARY OF THE INVENTION

To overcome the limitations in the prior art described above, and to overcome other limitations that will become apparent upon reading and understanding the present specification, the present invention is embodied in a system and method for managing and controlling accounts with generated profile information. In general, the system includes a data generator, a database and a search agent. The data generator generates, collects and processes data about potential buyers and generates customer profiles. Data can be collected and processed by any suitable means for generating profiles, such as a data gathering session.

For example, an interactive electronic portal or interactive directory can be provided to the general public for attracting potential customers and buyers. The potential customer or buyer can be provided with an interactive browsing environment and allowed to select information related to products or services offered by a seller. The search agent is used to create the database, which comprises organized profiles of buyers that define specific criteria.

A profile of the buyer can be created by inferring criteria desired by the buyer based on the interactive browsing and the selections made by the buyer. The profile and the inferred criteria can be compared with criteria of the products or services offered by subscribing sellers for matching specific products or services of subscribing sellers to that the buyer has a potential interest in. In addition, an account manager can automatically search the database for buyers that match products or services offered by subscribing sellers.

In particular, the system and method can operate in a real estate purchasing environment. An interactive electronic real estate listing directory can be provided to the general public for attracting potential customers and buyers. A database of buyer profiles can be generated by analyzing the browsing habits of the potential customers with the system and method of the present invention as described above. A subscribing listing agent can be alerted to buyers that have profile information and criteria that match real estate listings of the agent. This will enable the listing agent to target market potential buyers for particular listings.

Namely, the listing agent can contact buyers that are probably most interested in that particular listing based on the generated profiles. Further, the listing agent can manually search the database of buyer profiles for matching criteria of the agent's listings (such as certain characteristics of a listing, size of home, size of land, amenities, etc.) with buyers' profiles. As a result, the listing agent can find buyers automatically or manually instead of waiting for a buyer to find the listing agent.

The present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

I. Introduction

The present invention is a business management system and method embodied in an electronic sales and marketing tool that allows sales people to target potential customers. The system and method of the present invention targets potential customers by first providing an interactive electronic portal or interactive directory to the general public for attracting potential customers and buyers. Next, the system analyzes the browsing habits of the potential customers and buyers and then customer data is accessed for generating, managing and controlling profile information of the potential customers of the data that match predefined criteria. In addition, the system can append customer supplied information (i.e. name, address, demographics, etc.) to the generated profile. The present invention can be embodied in software that operates in a computer environment. In this environment, the software would be preprogrammed to generate customer profile information of attracted customers. The profile information can be generated from inferred data for allowing a seller to actively seek potential customers that would be interested in the seller's specific products or services. Also, data acquired from third party sources may be automatically appended to the profile by cross-referencing the inferred data or customer supplied information.

II. Exemplary Operating Environment

Figure 1:
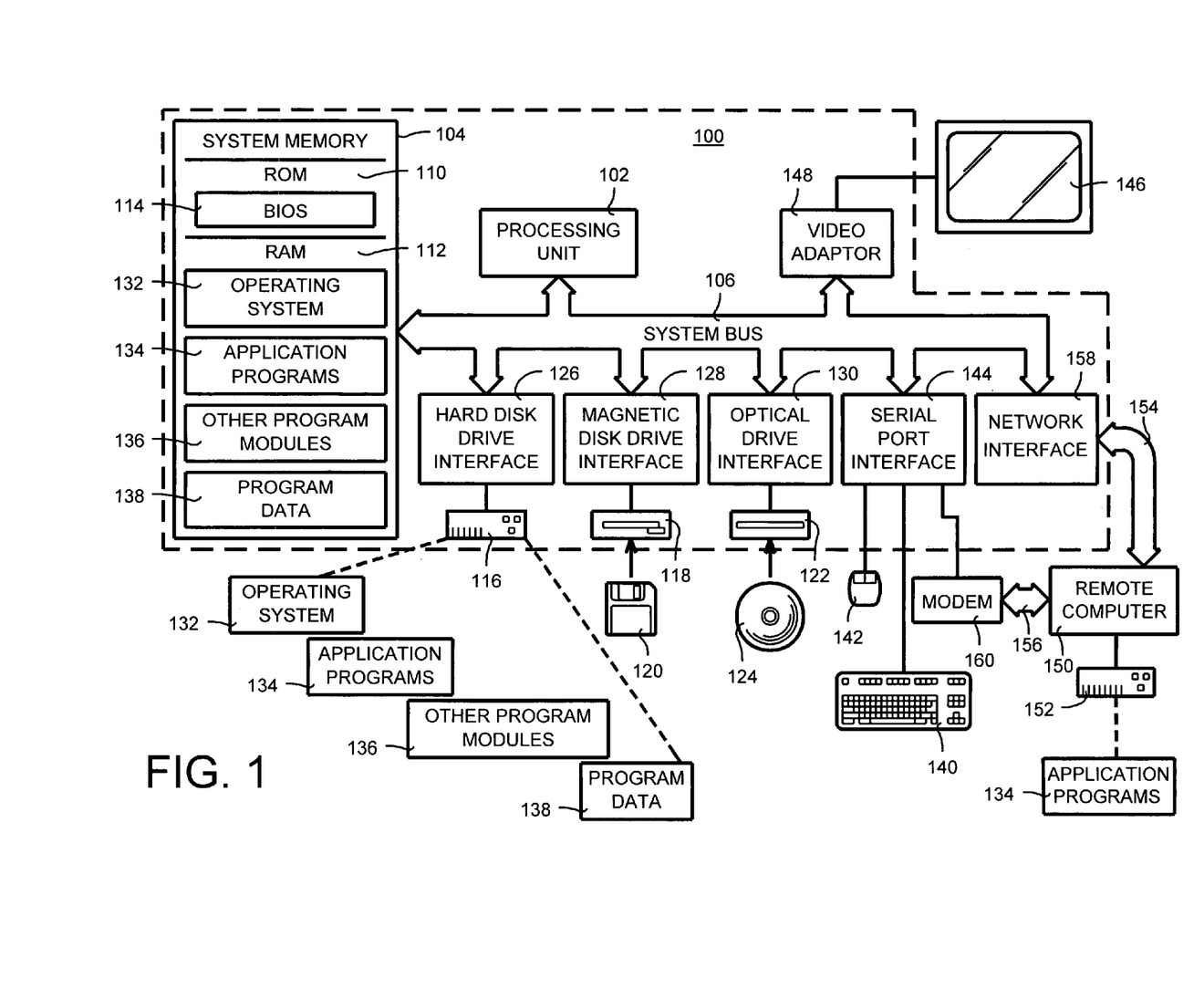
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote memory storage devices.

With reference to FIG. 1, an exemplary system for implementing the invention includes a general-purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system 114 (BIOS), containing the basic routines that help to transfer information between elements within the personal computer 100, such as during start-up, is stored in ROM 110. The personal computer 100 further includes a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide nonvolatile storage of computer readable instructions, data structures, program modules and other data for the personal computer 100. Although the exemplary environment described herein employs a hard disk, a removable magnetic disk 120 and a removable optical disk 124, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136, and program data 138. A user may enter commands and information into the personal computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the personal computer 100, or portions thereof, may be stored in the remote memory storage device. It will be appreciated that the network connections shown are exemplary and other means of establishing a communications link between the computers may be used, such as a direct connection via an integrated services digital network (ISDN) connection.

III. General Overview of the Components

Figure 2:
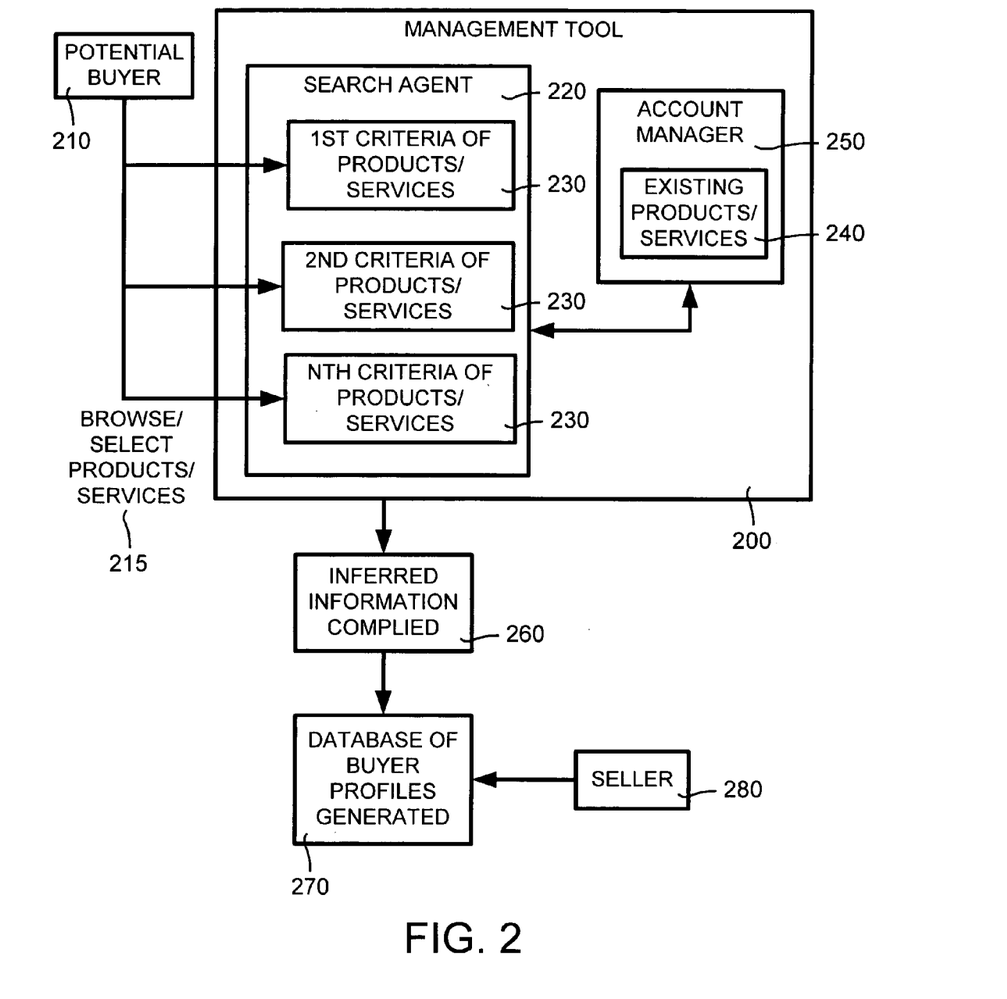
FIG. 2 is a general block diagram depicting an overview of the present invention.

FIG. 2 is a general block diagram depicting an overview of the present invention. In general, first, an interactive electronic portal or interactive directory is provided to the general public for attracting potential customers and buyers. Next, data about the potential customers or potential buyers 210 is collected and processed by the system 200. Data about the potential buyer 210 can be collected and processed by the system via a direct inquiry to the buyer 210 or with a generated profile. A profile preferably contains information about a prospective customer with criteria fields. The generated profile can be created in any suitable manner, such as by providing an interactive questionnaire to the buyer 210. Also, for customers that have browsing access to the system 200, customer profiles can be created with a search agent 220 by gathering statistics of products or services that the buyers previously browsed or accessed 215.

The search agent 220 preferably creates a database of buyers with organized profiles that define specific levels of criteria 230. The criteria 230 is compared to criteria 240 of new and existing products and services managed by an account manager 250. When a match occurs between the specific criteria 230 and the existing 240, the account manager 250 is notified of the match and an inference 260 about pertinent buyer information as well as the profile and the criteria that matched the products or services is created. Also, data acquired from third party sources, such as customer-supplied information, for example, name, address, demographics, etc. can be automatically appended to the generated profile by cross-referencing the inferred data or customer-supplied information.

The profile can comprise of inferences that are automatically developed based on selections and preferences that were made by the potential buyer 210 during a data gathering session, such as the interactive browsing 215 of products or services that was performed by the buyer 210. From these numerous inferences 260 of numerous buyers, a database of buyer profiles is generated 270. This enables a seller 280 with search capabilities of the database 270 for matching buyers 210 to products/services. The seller 280 can be automatically notified in any suitable manner, such by electronic mail, wireless telephone call, wireless page, or the like of real-time matches.

Figure 3:
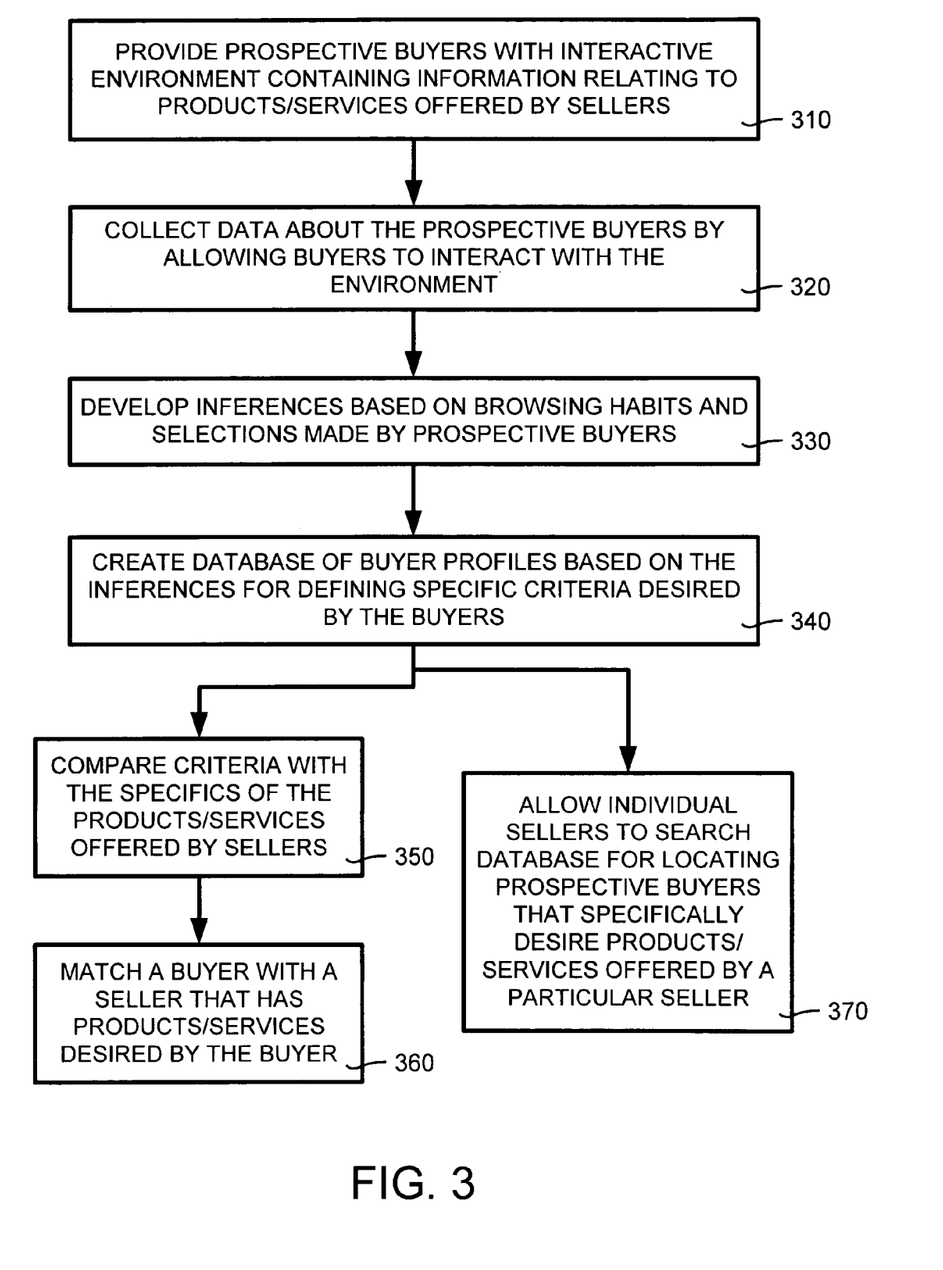
FIG. 3 is a flow diagram of the system and method of the present invention.

IV. Details of the Operation:

FIG. 3 is a flow diagram of the system and method of the present invention. The description that follows for FIG. 3 below is a concise explanation of the operation of the seller management tool 200 of FIG. 2. The seller management tool 200 allows interactive management and control of accounts of potential customers with generated profile information. The profile information contains pre-developed inferences about the potential customers.

First, prospective buyers are provided with an interactive environment containing information relating to products/services offered by sellers (step 310). Second, the system 200 collects data about the prospective buyers by allowing buyers to interact with the interactive environment (step 320). Third, the system 200 develops inferences based on browsing habits and selections made by the prospective buyers (step 330). Fourth, a database of buyer profiles is created based on the inferences for defining specific criteria desired by the buyers (step 340).

From this created database, the defined specific criteria of products/services desired by the buyers are compared with specific criteria of the products/services offered by sellers (step 350). After the comparison, a buyer can be matched to a seller that has products/services desired by the buyer (step 360). In addition, from the database created in step 340, individual sellers can search the database for locating prospective buyers that specifically desire products/services offered by the seller searching the database (step 370).

Figure 4:
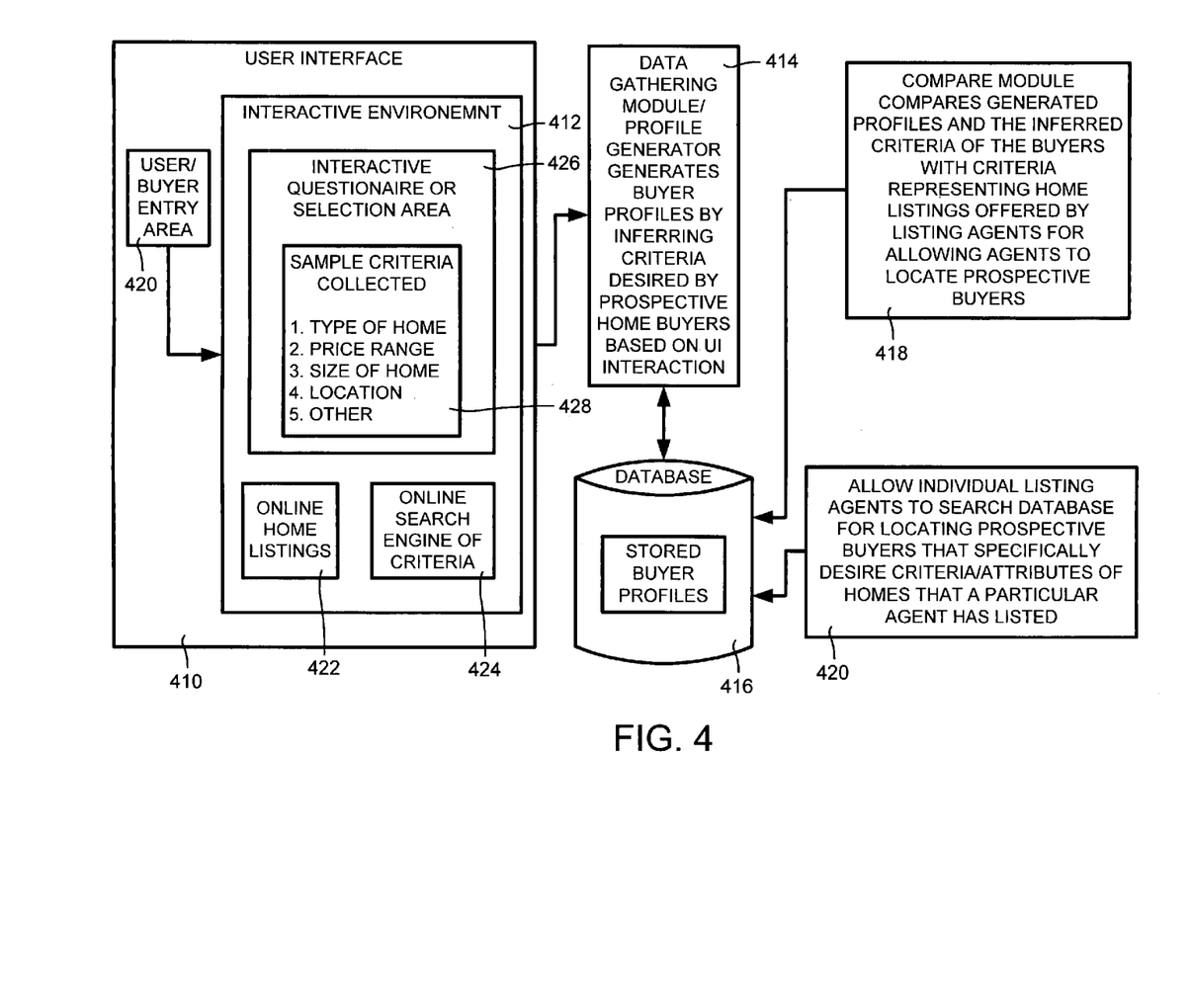
FIG. 4 is a detailed block diagram illustrating a working example of the present invention operating in a computer environment.

V. Working Example:

FIG. 4 is a detailed block diagram illustrating a working example of the present invention operating in a computer environment. The following discussion describes a working example of the present invention as a software implementation operating in a computer environment focused on real estate products and is provided for illustrative purposes only. It should be noted that numerous working environments exist for the present invention.

In the working example of FIG. 4, the present invention allows products or services offered by a seller, such as real estate listings, to find buyers, as opposed to the buyer finding the product or services offered by the seller. Thus, the present invention is a sales management tool for the sale of products/services. Preferably, the present invention is implemented in a computer network environment, such as a local area network, wide area network, the Internet and the like.

Although the present invention can operate in any sales environment, the description that follows shows the present invention operating in a real estate purchasing environment. In general, in a real estate environment implemented in a computer network system, the present invention could include a user interface 410 with an interactive environment 412 for buyers connected to a data gathering module 414 and a database 416, which is connected to a compare module 418.

In operation, the interactive environment 412, such as a portal or interactive directory, is provided to the general public for attracting potential customers and buyers. The potential buyers browse or enter information 420 into the interactive environment 412 of the user interface 410 which could contain products/services gateways. The gateways could include categorical directories of home listings 422, search engines 424 for finding homes with specific criteria based on user entered search terms relating to the specific criteria, interactive questionnaires 426, or any other suitable gateway that allows a buyer to browse/access home product/service information.

The data gathering module 414 then generates buyer profiles by inferring criteria desired by prospective buyers based on the interaction with the user interface 410 of the buyers. In other words, the data gathering module 414 collects data about each buyer based on the browsing habits via the interactive environment 412 (products/services accessed or browsed by each buyer) of each buyer. The generated buyer profiles are then stored in the database 416 for further reference.

Next, the compare module 418 compares generated profiles and the inferred criteria of the buyers of the database 416 with criteria representing home listing offered by listing agents (stored, for example, in a separate listing database) for allowing agents to locate prospective buyers. In addition, individual listing agents can search the database 416 for locating prospective buyers that specifically desire criteria/attributes of homes that a particular agent has listed 420.

For example, the database 416 can contain buyer profiles that were gathered by an interactive internet World Wide Web (WWW) site (having user interface 410), for instance with an online interactive questionnaire 426 or by a statistical collection of homes that the buyer previously browsed via the WWW site 410. As such, a real estate listing agent can receive a targeted sales lead from a casual home shopper via the interactive environment 412 associated with the interactive WWW site 410.

Namely, the compare module 418 can be used to alert the listing agent to buyers that have profile information and criteria that match real estate listings of that agent. Thus, the listing agent is able to target market particular listings by contacting buyers that are probably most interested in that particular listing. In addition, the listing agent can manually search the database for profiles of buyers that match criteria of the agent's listings 420. Consequently, the agent can search the database 416 of buyer profiles using certain characteristics of a listing as criteria (e.g. "look for all buyers that might be interested in a five bedroom home with a three car garage with a swimming pool"). Hence, listings can find buyers automatically or manually.

Specifically, sales leads can be treated as a "farm" of buyer profiles. In the real estate scenario, each lead usually contains valuable information about the area, price range, and home type the prospective buyer is seeking, based on the home that the prospective buyer inquires for information. A real estate listing agent could also create profiles from existing clients.

A profile preferably can contain information about a prospective customer with fields that can include, home criteria, type, price range, bedrooms, baths, square feet, areas of interest, whether the prospect is pre-qualified or not (if so, for how much). Other fields can include special categories (e.g. luxury, waterfront, first-time homebuyer, investor seeking fixer-upper, upgrader, downgrader), time horizon for purchase/seriousness in market, contact information, general notes on the prospect (for example, can include reminder text in the user interface that the notes must meet Equal Housing criteria). Further, other example fields would include a list of homes already shown to the prospect (so a user doesn't get shown the same home again), last date of confirmation they're still in the market for a home, location of current home, willingness to be on broker's or agent's mailing list or e-mailing list, and the like.

Figure 5:
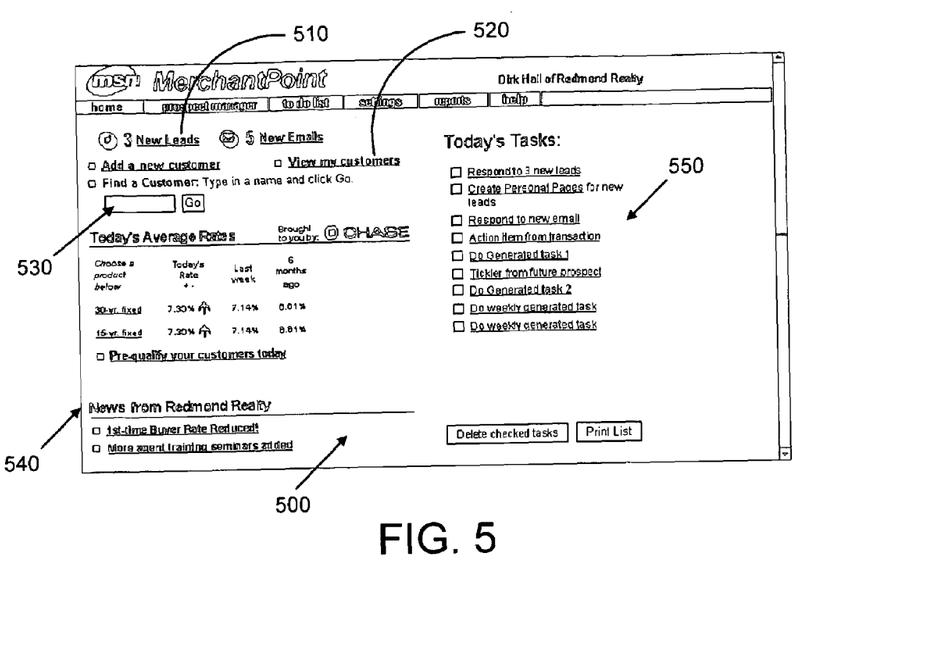
FIGS. 5–7 are user interfaces of the account manager illustrating the working example of the present invention operating in a computer environment.
Figure 6:
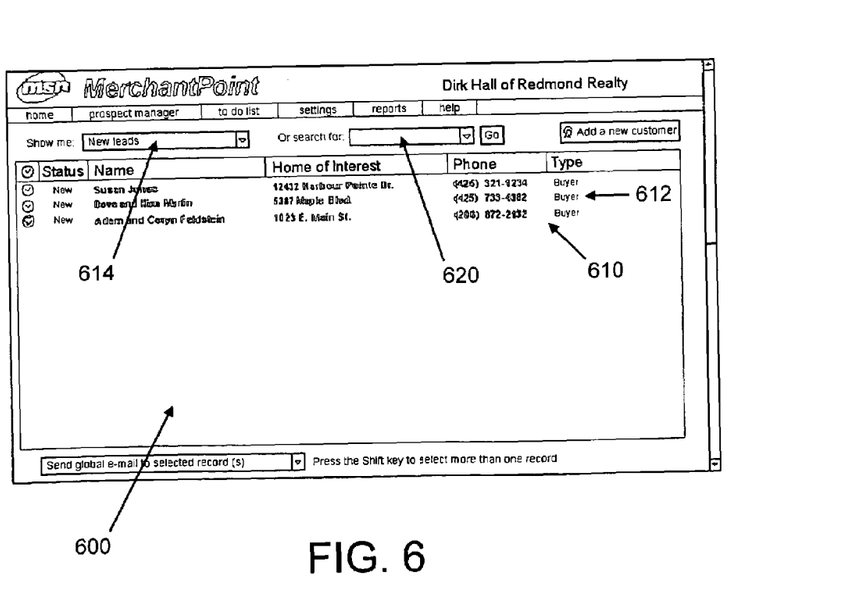
Figure 7:
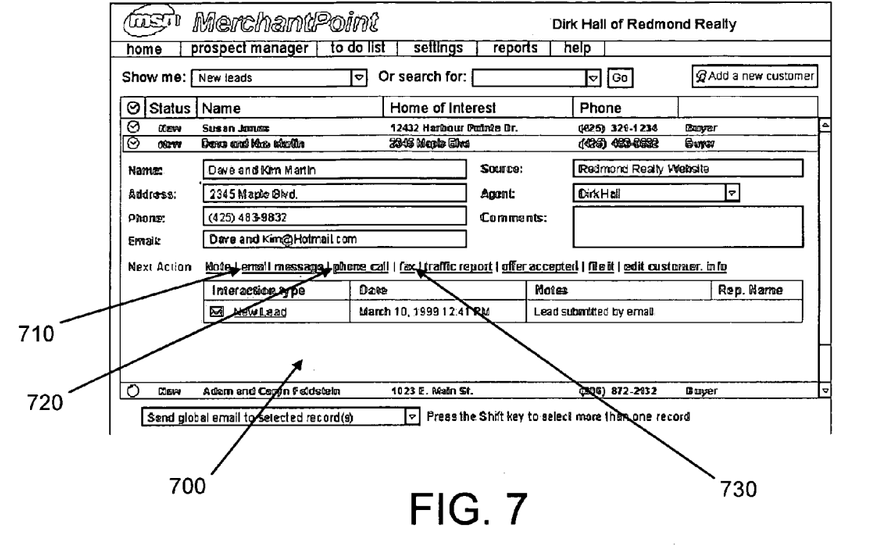

FIGS. 5–7 are user interfaces of the account manager illustrating the working example of the present invention operating in a computer environment. The following discussion of FIGS. 5–7 refer to the interactive account manager for allowing dealers/merchants/sales staff to manage and control (such as reviewing, updating, revising and modifying account information) account information for prospective, current, and in some cases, past customers.

Referring to FIG. 5, the user interface 500 contains several function sections. For example, these sections could include a new customer section 510 for tracking new sales leads and emails and an existing customer section 520 for tracking existing sales leads and emails. Also, a customer search section 530 for finding prospective buyers, a news section 540 for allowing updates from predefined sources and a task section 550 for keeping track of daily and weekly tasks could be included.

The account manager interface 500 is an account information tool for receiving network information to help account users, such as sales representatives, find new customers, care for existing customers, and track the relationship between an Internet sales representative and new and existing customers. The account manager allows a remote client user, such as an Internet user to easily view sales results of generated sales leads, such as Internet generated sales leads, of prospective customers. Also, the system 600 allows centralized control and management of the accounts by Internet administrators generating the sales leads. The interface can be used for managing Internet generated home sales leads.

For example, an agent could "farm" his/her profiles by matching homes on the market with his/her own profiles 610. If an agent lists a home, or finds a home on the market, he/she can search through his/her database of profiles for matches. He/she could use the resulting list as a basis for calldowns. As such, homes on the market would be matched with profiles across the brokerage (the network effect). Also, the agent could share her own profiles with all other agents in the brokerage. Every agent's profile-matching searches could then be run across a large number of profiles. In addition, the contact information for the profiles could be kept hidden from other agents, so if a good match occurs with another agent's prospects, then the two agents could get in contact with each other to work out the details. Thus, the net effect would be similar to an "all-agents meeting", where listing agents mingle in an attempt to find other agents with buyers for their listings.

As shown in FIG. 6, the account manager could include a user interface 600 for categorically organizing and listing customers. For example, initial results of a search or a selection of a customer can be displayed on user interface 600 within a grid 610 in an organized and pre-formatted manner. It is then determined whether the user desires detailed or the initial general results. If the user desires the initial general results, the client displays the initial results transmitted to the client within the grid 610. The high level results are displayed as a contracted view with single line items 612. Each line item 612 of the grid 610 is preferably dynamically expandable (expanded results are shown in FIG. 7 and will be discussed below) and contractible for providing real time interaction of the results.

Interactive interface options can be included, such as alphanumerical input boxes and drop-down menus 614 containing configurable and selectable data. Also, a search query input box 620 can be connected to a customer search engine that access the database 416 of FIG. 4. The configurable alphanumerical input boxes can be used to narrow results. In addition, the drop-down menus 614 and radio buttons (not shown) can have predefined criteria as the interface options. Preferably, the use of the input boxes, drop-down menus, radio buttons or the like, is in real time. Therefore, as the user adjusts the interface options, the data is filtered and displayed by the client dynamically.

If the user desires specifics of the line items 612, the user can select on the desired line item for viewing details or an expanded view of the selected item. The expanded view of the grid 610 can contain static or dynamic information, such as plain text, graphics, dynamic audio, dynamic video, hyperlinks, interactive options, such as toolbars, etc. In addition, indicia such as text formatting and markers, such as unbolded text, highlighted text, colored text, italicized text, indicator marker arrows, etc., can be used to indicate that the particular line item has been previously expanded.

FIG. 7 shows lines items of FIG. 6 in expanded form as a user interface for facilitating email connectivity between the agent and existing and potential customers that match the criteria of existing listings of the seller. The user interface 700 for email connectivity can contain several function sections. For instance, one example sections could include a customer management section for managing email customer interaction 710, telephone interaction 720 and facsimile interaction 730 between the agent and customers.

The grid 610 of FIG. 6 can be dynamically configured to allow real time viewing and interaction of multiple expanded line items 612 of FIG. 6 with details within the grid and multiple contracted line items at the same time. This provides convenient comparison and real time interactivity for sorting, adjusting and filtering the detailed and general item information with one grid view with the interface options, as discussed below.

The user is provided with real time interactivity of the results through interactive user interface options, such as graphical user interface tools. These interface options can include selectable areas, configurable slider filters, input boxes that can accept alphanumerical input or the like, drop-down menus or any suitable interface, such as graphical gauges that allow a user to move graphics within a reference datum for adjusting the criteria for associated fields in real time. For example, a selectable area, such as a status category, can be selected by the user in order to dynamically sort the results based on status criteria of each item.

The present invention has numerous benefits to sellers, such as a listing agent. For instance, the present invention allows for better use of the leads that come in through their listings, easier for the listing agent to find potential buyers. Also, the listing agent can search for prospects before listing the home to gauge demand. In addition, the present invention could help increase seller representations by informing potential home sellers that if a particular home is listed, there are n homebuyers that can be called upon whom are known to seeking a home like the particular home. Further, buyers' agents and agents without listings gain an opportunity for listings to find their prospects. Another benefit is that a low-effort relationship with a large number of prospects that are "always in the market" can be maintained. In other words, rather than trying to fully engage a prospect that's just waiting for the right listing to come along, they can find a prospect's profile and wait until it appears in a profile search.

Benefits to the broker includes increasing the opportunity of keeping new listings within the brokerage and giving agents an incentive to be part of a larger brokerage where there are more profiles. Also, a broker's pool of agents can be collaborated instead of having each agent work alone.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A computer implemented method for finding a prospective buyer and providing the identity of the buyer to agents offering for sale at least one of products and services, the method comprising using a computer to perform the following process actions:
   providing the buyer with an interactive environment having information relating to the products or services offered by the agents;
   creating a profile of the buyer by inferring criteria desired by the buyer by gathering statistics of products or services previously browsed or selected based on the buyer's interaction with the interactive environment, wherein the statistics are analyzed to determine the most common characteristics;
   creating a database of buyer profiles and defining groups of specific criteria based on the characteristics for specific buyers;
   comparing the profile with criteria of products or services offered by the agents to match a suitable agent with a suitable buyer based on the created profile of the buyer by automatically matching specific products or services of the agents that the buyer has a potential interest in based on the created profile of the buyer; and
   automatically providing the identity of the suitable buyer that would allow direct contact of the buyer by the suitable agent to the suitable agent without the suitable agent having to request additional information.

2. The computer implemented method of claim 1, wherein the interactive environment includes allowing the buyer to graphically interact with information relating to the products or services.

3. The computer implemented method of claim 2, wherein the buyer selects information relating to the products or services.

4. The computer implemented method of claim 1, wherein the interactive environment includes providing an interactive questionnaire to the buyer.

5. The computer implemented method of claim 1, further comprising the process action of providing agents access to the database to allow the agents to locate specific buyers based on criteria defined by the agents.

6. The computer implemented method of claim 1, wherein the buyer is provided with selections relating to real estate offered by the agents during interaction with the interactive environment.

7. The computer implemented method of claim 1, wherein the identity of the buyer includes name, and email address or telephone number.

8. A computer system for target marketing prospective buyers, comprising:
   an interactive browsing environment that allows the prospective buyers to browse information relating to at least one of products or services, each represented by discreet criteria and offered by agents;
   a profile generator that creates and stores profiles of the buyers by inferring criteria desired by the buyers by gathering statistics of products or services previously browsed or selected based on the interactive browsing of the buyers, wherein the statistics are analyzed to determine the most common characteristics;
   a comparator that:
      creates a database of buyer profiles and defines groups of specific criteria based on the characteristics for specific buyers;
      matches the profiles with criteria of products and services offered by the agents to match a suitable agent with a suitable buyer based on the created profile of the buyer by automatically matching specific products or services of the agents that the buyer has a potential interest in based on the created profile of the buyer; and automatically provides an identity of matching prospective buyers that would allow direct contact of the buyers by an agent for the sale of at least one of the products and services to the agent without the agent having to request additional information.

9. The computer system of claim 8, wherein the interactive browsing environment is a graphical user interface.

10. The computer system of claim 8, wherein the profile is created based on the browsing habits of the buyer during interaction with the interactive environment.

11. The computer system of claim 8, wherein the buyers are provided with selections relating to the products or services during interaction with the interactive environment.

12. The computer system of claim 8, wherein the interactive environment is a graphical interactive questionnaire.

13. The computer system of claim 8, wherein the agents are provided with access to the database to allow the agents to locate specific buyers based on criteria defined by the agents.

14. The computer system of claim 8, wherein the identity of the buyer includes name, and email address or telephone number.

\* \* \* \* \*